Dec. 30, 1924.

C. F. JENKINS 1,521,190

DRUM LENS CARRIER

Filed Sept. 11, 1922

Inventor
C. Francis Jenkins

Patented Dec. 30, 1924.

1,521,190

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

DRUM LENS CARRIER.

Application filed September 11, 1922. Serial No. 587,520.

*To all whom it may concern:*

Be it known that I, CHARLES FRANCIS JENKINS, a citizen of the United States, residing at Washington, District of Columbia, have invented certain new and useful Improvements in Drum Lens Carriers, of which the following is a specification.

This invention relates to apparatus for broadcasting and receiving motion-pictures-by-radio, the principal object of which is to provide a means for rapidly covering the picture area within the time of persistence of vision, for example, that is, twelve to sixteen times per second, without involving a too high rotative speed.

Figure 1:
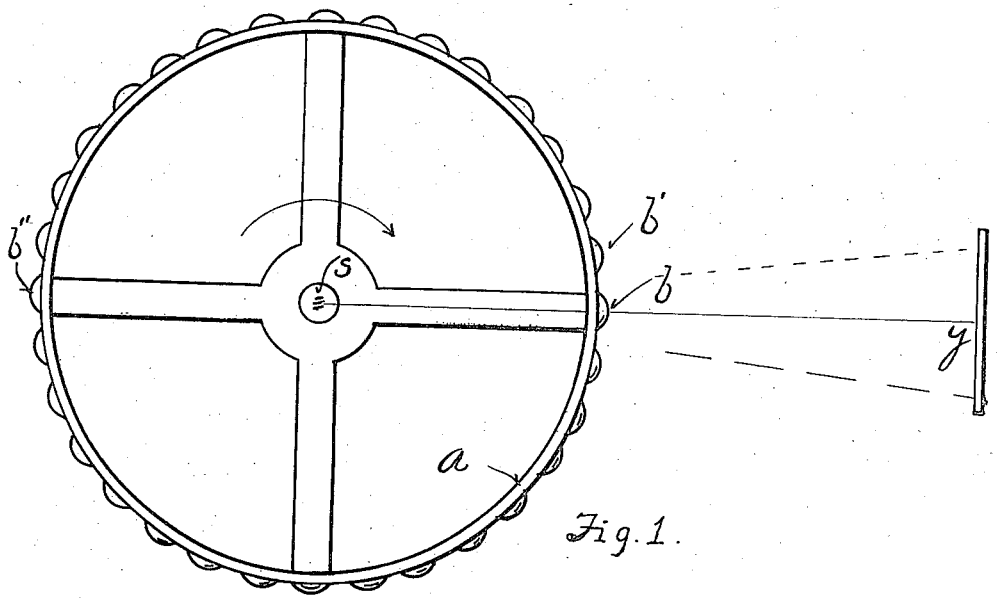
Figure 2:
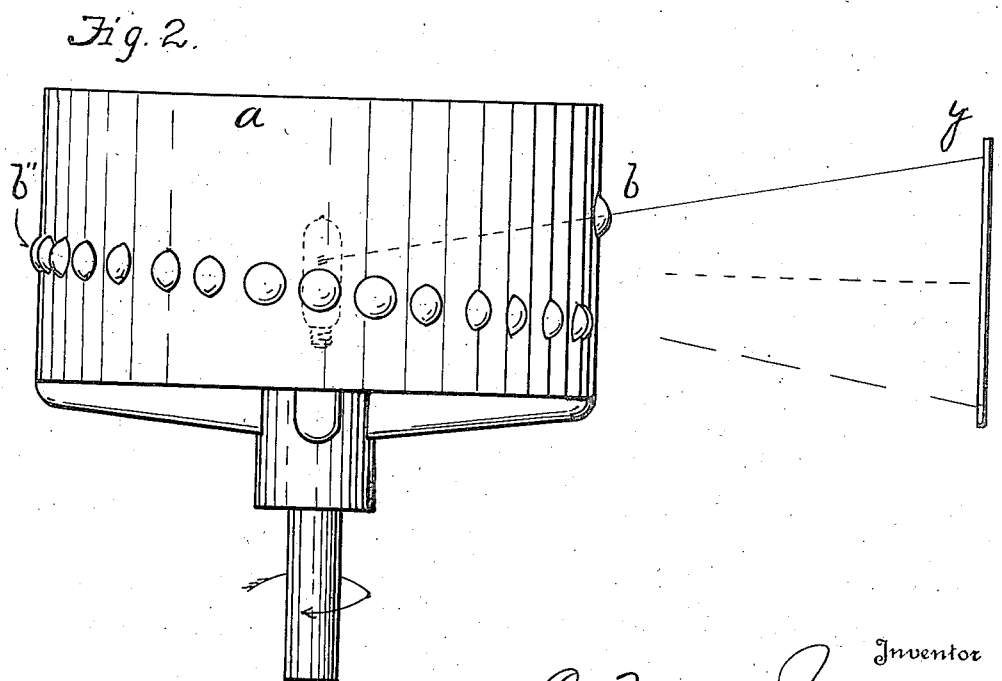

In the figures accompanying this application, Fig. 1 is a top view, Fig. 2 an elevation of the device employed. In the drawings Y is an edge view of the light-receiving surface; S a source of light; A a wide-rimmed wheel in which are spirally set a number of like lenses, each located in the wheel rim at a greater distance from the median plane of rotation than the adjacent lens.

Light shining out from S through a lens in the direction of the solid line falls on the light-receiving surface Y. As the lens supporting drum A continues to rotate (in the direction of the arrow) the line S—Y passes across the light-receiving surface Y.

As the field of vision of the lens B passes off the picture surface, at a position shown by dash lines in Fig. 1, the next lens following, B', begins in like manner at the top edge of the picture surface, (dotted line Fig. 1), crossing as did the other, except that this lens being slightly lower, than the preceding lens travels across the picture surface in a line below the first. And so each lens in succession crosses the picture surface, but each, because it is situated slightly lower than the adjacent lens, travels always in a line below that of the preceding lens from the position of the solid line in Fig. 2, past the position of the dotted line which represents the line of light which lens B'' would make, until the last line is made, across the bottom of light-receiving surface, by the lowest lens.

Thus the whole picture surface is covered in lines from left to right, and as a whole from top to bottom; every part of the picture surface, therefore, having been covered by a pencil of light from the light source S.

It will readily be understood that the lens carrier might be a disc instead of a drum or wheel, without departing from the principle involved, but as this change would require no invention, but could be readily made by any mechanic on request, no illustration is believed necessary.

What I claim, therefore, is—

1. A rotating carrier having mounted thereon a plurality of similar optical elements each situated at a different distance from a given plane of rotation.

2. A rotating carrier having mounted thereon a plurality of like lenses each situated at a different distance from a given plane of rotation.

3. A rotating lens carrier having apertures therein approximately equi-spaced circularly, and at different distances from the circular edge plane of the carrier, and having mounted over said apertures a succession of like lenses.

4. The combination of a rotating apertured lens carrier, having mounted thereon a plurality of like lenses each approximately equi-spaced circularly around the carrier, and at different distances from the circular edge plane of the carrier, a light source, and a light receiving surface, each so located that the light passing through the several lenses in succession will, as the carrier is rotated, cover the receiving surface in adjacent parallel lines.

In testimony whereof I have affixed my signature.

CHARLES FRANCIS JENKINS.